United States Patent Office 2,764,015
Patented Sept. 25, 1956

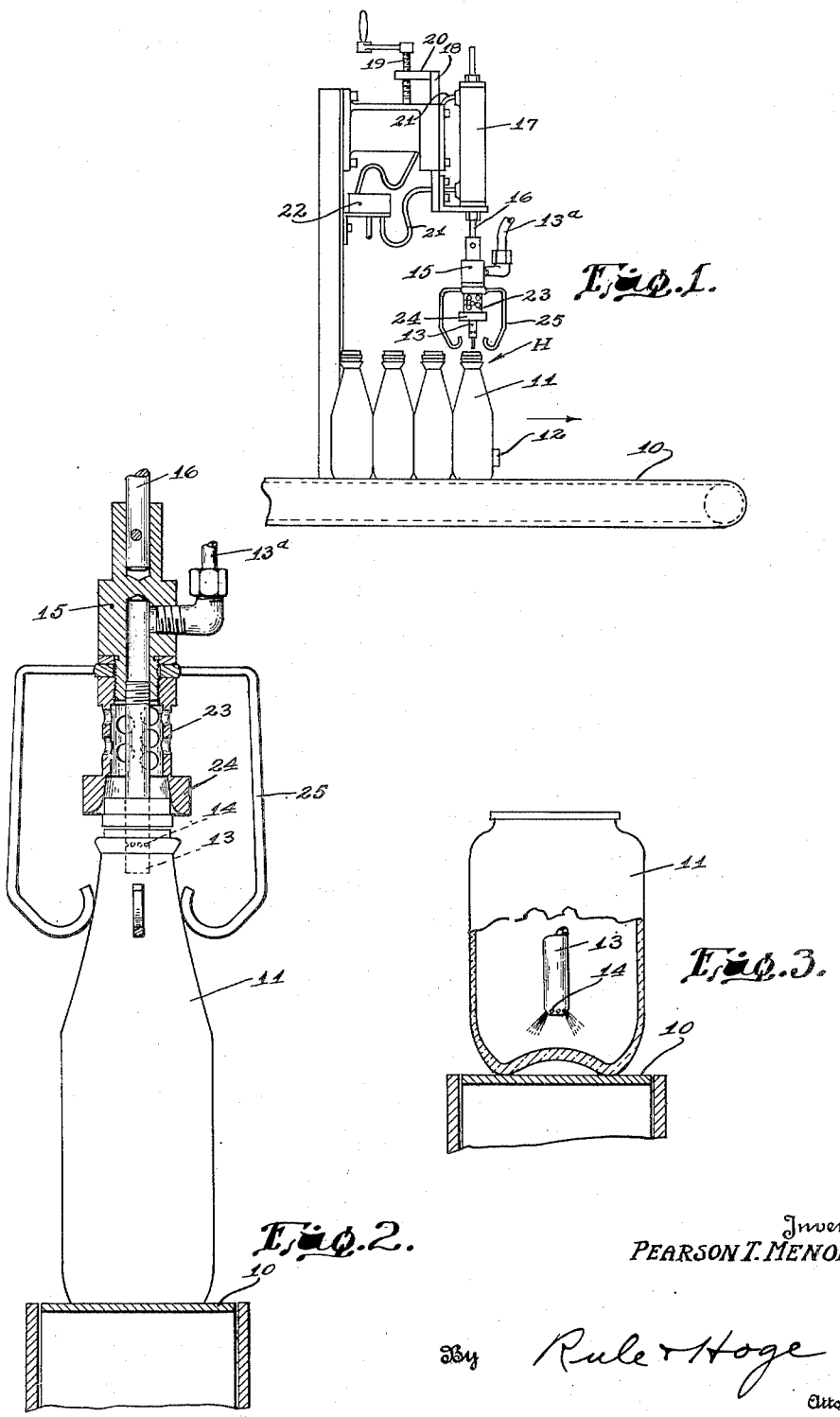

2,764,015
METHOD OF DETECTING DEFECTS IN GLASS CONTAINERS

Pearson T. Menoher, Oakland, Calif.

Application August 28, 1953, Serial No. 377,103

4 Claims. (Cl. 73—15)

The present invention is a method of detecting surface defects in glass bottles, jars and like articles.

Glass containers that break in service after leaving the manufacturer's plant result not only in loss of glass but also loss of the product packed. Breakage of glass containers in service almost always originates in some surface imperfection or damage such as checks, crizzles, lapped glass, bruises, etc. The stresses placed on glass containers in the packing process from thermal shock, capping forces, internal pressure, etc., will concentrate at any surface defect and cause breakage to originate there.

An object of my invention therefore is to determine in advance of packing, whether the bottles and jars contain any surface defects which will permit breakage, as explained above, and if so, actually break the bottles, or in any event indicate such defect so that it will be visably apparent to the ware selector, or inspector in the glass plant, or may be selected out automatically.

Another object of my invention is the provision of automatic mechanism which will rapidly heat selected surfaces of bottles and jars and so timing the operation that the glass, which has already been annealed, will not be heated above its strain point. Thus no permanent strains are introduced. Rather, only temporary strains which will immediately break a defective article, are created.

Other objects will be in part apparent and in part pointed out hereinafter.

In the drawings:

Fig. 1 is a side elevational view more or less schematically showing one form or arrangement of the heating mechanism;

Fig. 2 is a detail sectional elevational view showing the heating device projected into a bottle neck opening; and Fig. 3 is a view similar to Fig. 2, but shows the burner substantially fully projected into a wide-mouth jar.

According to my invention, bottles or jars formed of glass are subjected to annealing in the usual or any preferred manner and then allowed to cool substantially to room temperature. Some such containers may incorporate surface defects which are not readily discernible, if at all, by visual inspection, yet are such that when the containers are stressed incident to the packing process or in later service will cause breakage of the containers.

Consequently prior to shipment to the packers' plants, I subject these annealed containers to stresses substantially corresponding to those which the container will experience at the time of packing in the customer's plant, or in subsequent service. I have done this by making use of the unique properties of glass combined with controlled differential heating. I effect such rapid heating of the interior surface, or any selected portion thereof, that in a matter of about one second, a momentary high tensile stress is created in the opposed or exterior surface opposite said selected portion. Such rapid heating of the interior surface, without corresponding heating of the exterior surfaces results in the creation of temporary stress which will break the container, at the point or points of location of the external surface defects. It is imperative that the temperature be kept below the strain point of the glass, such temperature in convenional bottle glass being within the range of about 412° C. to 472° C. The period of time of such heating may be in the neighborhood of one second, but such, as well as the heat intensity, may vary according to the design of the bottle so that the testing stress to which the surface of the bottle is subjected corresponds to the stress which the container must sustain in packing or in later service. The duration of heating and heat intensity may be varied to break containers with any desired degree of surface imperfections.

The apparatus involved comprises a horizontal conveyor 10 which carries the bottles 11, jars or the like, in single file to and away from a heating station H, where their forward travel is arrested momentarily by means of a gate 12, or such stop device. The gate may be actuated mechanically by any of a number of available devices (not shown) and suitably timed with relation to lowering of the heater element 13.

This heater element 13 may well comprise a burner having apertures 14 and utilizing gas and oxygen or other fuel, supplied by means of a pipe 13ª. These apertures 14 may be arranged in any desired pattern as determined by the concentration of heat required. Combustion need not occur within the bottle or jar. Moreover, other hot gases such as steam, compressed air, etc., may be used. The burner is mounted upon a holder 15 which may be carried by a rod 16 constituting an extension of the piston rod of a vertical air cylinder 17. This air cylinder 17 is adjustable vertically on a supporting bracket 18 by means of a screw 19 which is threaded vertically through an arm 20 attached to the cylinder and bears against said bracket. Thus the mechanism may be adjusted as to height, as required by bottles or jars varying in height and to determine, or select the specific surface of the container to be heated. Air under pressure is supplied alternately to the upper and lower ends of the cylinder through pipes 21 which are connected to a timer 22, the latter regulably controlling the delivery of air to said cylinder and determining the duration of each heating period.

A ventilated spacer 23 separably connected to the holder 15 and depending therefrom surrounds a portion of the burner pipe 13ª and carries a guide ring 24 which aids in effecting proper axial positioning of said burner pipe within the bottle. Guide fingers 25 mounted upon said holder and held thereon by means of the spacer 23 further assist in effecting the stated positioning of the bottle.

In view of the foregoing it is apparent that as bottles or jars come to a position in register with the burner or heater element, they are stopped momentarily by the gate 12. Immediately, the burner is projected into the container a distance predetermined by setting of the adjusting screw 19. The interior surface selected is quickly heated to a high temperature thereby subjecting the opposed exterior surface to high tensile stress causing breakage of articles containing defects, as described previously. Thus glass containers having serious surface defects, as explained heretofore, are disposed of in the glass plant rather than delivered to the customer's plant.

The same method of testing glass containers can be applied to detect surface imperfections such as scratches on the inside surfaces of bottles by controlled heating from the outside.

Modifications may be resorted to within the spirit and scope of the appended claims.

I claim:

1. The method of detecting the presence or absence of a defect in an isolated selected exterior surface area of an annealed glass bottle or like article which consists in rapidly flame heating only the surface directly opposite said exterior surface area from about room temperature, to a degree below the strain point of the glass but sufficiently to quickly create a momentary high tensile stress in the selected exterior surface area and cause a break in the glass at the location of the defect.

2. The method of testing an annealed bottle or the like hollow glass article to determine the presence or absence of a defect in a selected isolated surface area, which consists in effecting rapid localized flame heating of only a restricted surface area of the bottle wall directly opposite the selected isolated surface area, from approximately room temperature to a temperature below the strain point of the glass in a period of time of about one to two seconds, but sufficiently to create temporary high tensile stress in the isolated surface area only and cause breakage of the glass at the location of a defect in such area.

3. The method of testing an annealed bottle or the like hollow glass article to determine the presence or absence of a defect in a selected isolated area of the exterior surface, which consists in effecting rapid localized flame heating of only a restricted area of the interior surface of the wall directly opposite the selected isolated exterior surface area, from approximately room temperature to a temperature below the strain point of the glass, but sufficiently to create a momentary high tensile stress in the selected isolated exterior surface area only and break the glass at the location of a defect in the latter area.

4. The method of testing an annealed bottle or the like hollow glass article to determine the presence or absence of a defect in a selected isolated exterior surface area, which consists in bringing the bottle with its open end uppermost to a testing station, projecting a flame heating element through said open end, holding said element in proximity to that area of the inner wall surface directly opposite said isolated area for a period of about one to two seconds to heat said inner wall surface to a degree near but below the strain point of the glass and thereby creating a momentary high tensile stress in the isolated exterior surface area only and cause breakage of the glass at the location of a defect in said area and removing the heating element before the glass has been heated to the strain point.

References Cited in the file of this patent

UNITED STATES PATENTS

| | | |
|---|---|---|
| 2,073,144 | Darrah | Mar. 9, 1937 |
| 2,167,185 | Preston | July 25, 1939 |
| 2,209,252 | Stewart et al. | July 23, 1940 |
| 2,301,316 | Orr et al. | Nov. 10, 1942 |
| 2,539,159 | Peiler | Jan. 23, 1951 |
| 2,613,480 | Mongan | Oct. 14, 1952 |